Aug. 9, 1932.  E. J. CONTOIS  1,870,606
COUPLER
Filed Jan. 17, 1930  2 Sheets-Sheet 2
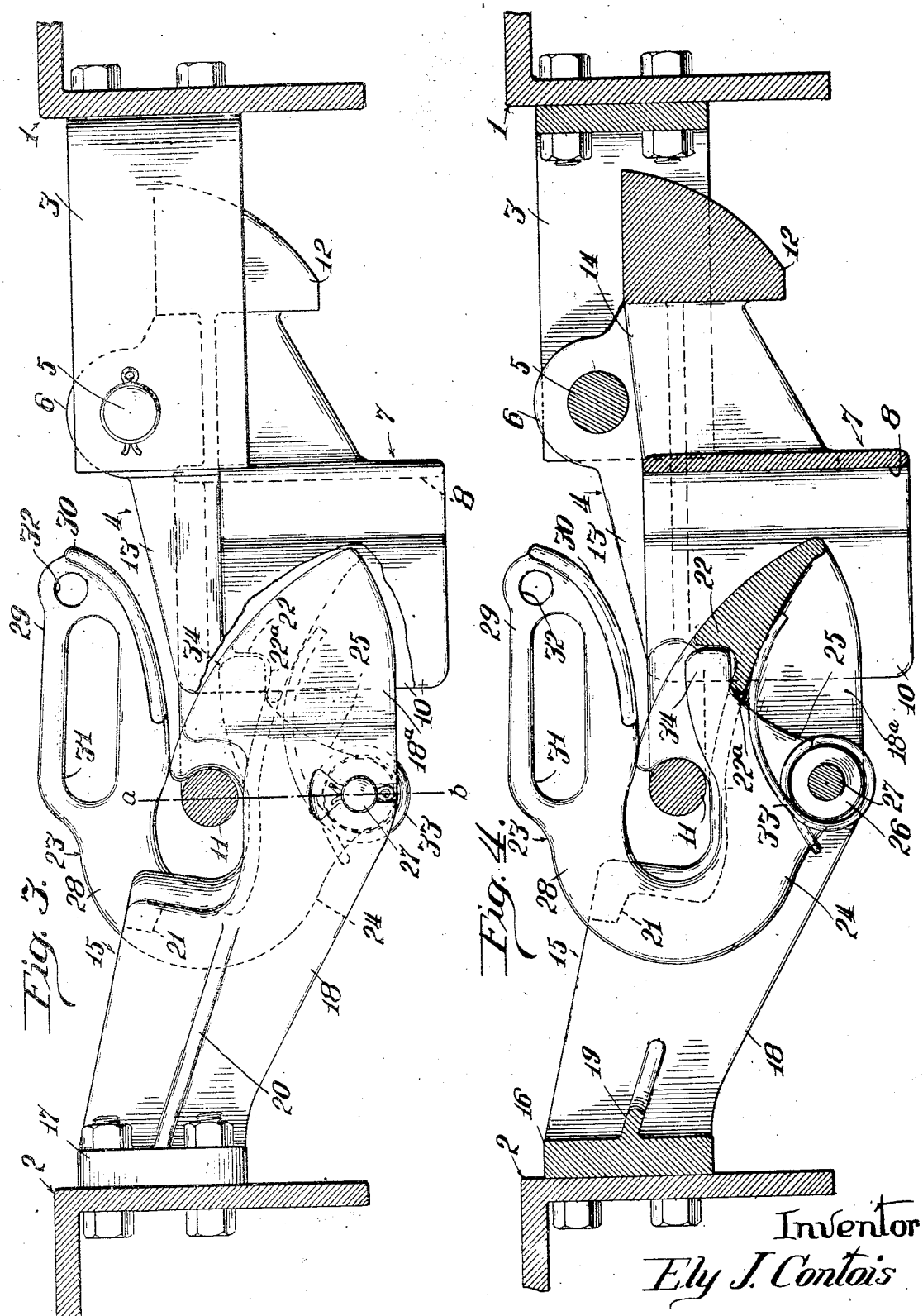
Inventor
Ely J. Contois
By Brown, Jackson, Boettcher & Dienner.
Attorneys.
Witness
Milton Lenoir

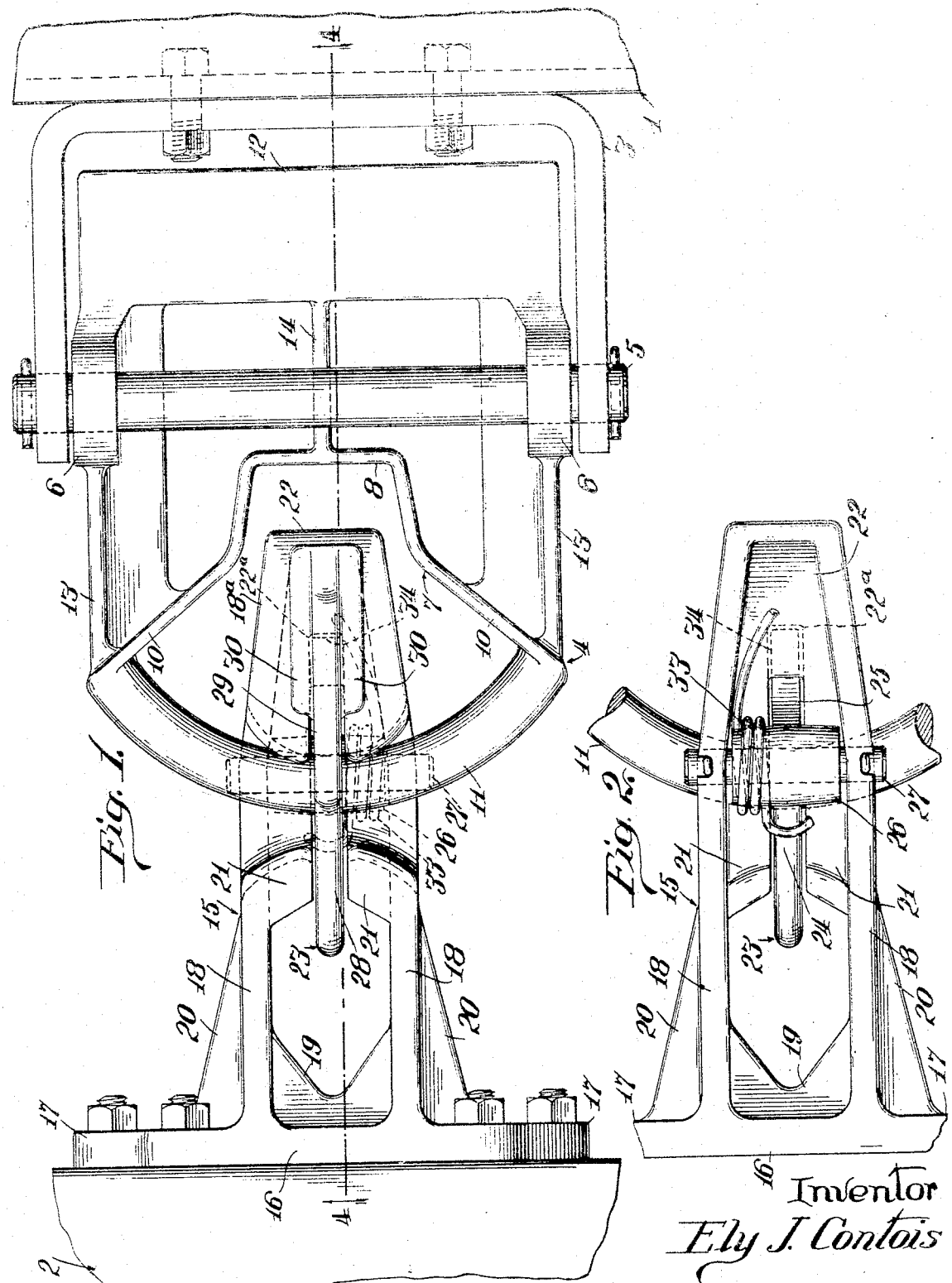

Patented Aug. 9, 1932

1,870,606

UNITED STATES PATENT OFFICE

ELY J. CONTOIS, OF BATTLE CREEK, MICHIGAN, ASSIGNOR TO CLARK TRUCTRACTOR COMPANY, OF BUCHANAN, MICHIGAN, A CORPORATION OF MICHIGAN

COUPLER

Application filed January 17, 1930. Serial No. 421,367.

This invention relates to coupling devices, and more particularly to a coupler adapted for use in coupling together a tractor and a trailer, or two or more trailers to form a train.

Coupling devices of the general character referred to are known in the art, by means of which a tractor and a trailer, or two trailers, are automatically coupled together by relative movement of the same toward each other. In devices of this character it is known to use a latch member for coupling engagement with a coupling ring or equivalent member, this ring being carried by a coupling head and the latch member being carried by a draw head. In such a construction the latch member is subjected to severe stresses during the coupling operation and during transportation of the load.

This is objectionable due to the liability of breakage of the latch member and associated parts and the necessity of constructing this latch member in such manner as to prevent, as far as possible, such breakage. There is also the possibility, in coupling devices of the character referred to, of the latch member being opened or raised by pressure exerted thereon by the coupling ring or equivalent member, due to unevenness in the floor or supporting surface, with the result that the trailers become uncoupled with consequent delay and possible damage.

One of the main objects of my invention is to provide coupling means in which a latch member is employed for holding the coupling ring or equivalent member coupled to the draw head, this latch and the draw head being so related that the stresses incident to coupling and to transportation of the load are taken by the draw head thus relieving the latch member of all stresses of such a nature as to be injurious thereto. Another object is to provide a novel relation between the draw head and latch member whereby casual opening of the latch member due to pressure exerted thereon by the coupling ring or equivalent member is effectively eliminated. Further objects and advantages of my invention will appear from the detailed description.

In the drawings:—

Figure 1 is a plan view of a coupler constructed in accordance with my invention as applied and with the parts in coupled relation;

Figure 2 is an underneath view of the draw head and the coupling ring, broken away and shown in coupled relation;

Figure 3 is a side view of the coupler, with the parts in coupled relation, the coupling head being partly broken away and the coupling ring being shown in section;

Figure 4 is a sectional view taken substantially on line 4—4 of Figure 1.

I have illustrated my coupler as applied to two trailers indicated by reinforcing angle bars 1 and 2 suitably secured to the respective trailers, though it is equally capable of being used with a tractor and a trailer. For convenience of description I consider the trailer 1 as the forward trailer and the trailer 2 as the rearward trailer. A U-shaped bracket 3 is bolted or otherwise suitably secured to the reinforcing angle bar 1 of the forward trailer. A coupling head 4 is pivotally mounted in bracket 3, for movement on a horizontal axis, by means of a pivot pin 5 passing through the ends of the arms of the bracket and through bearing eyes 6 of the head.

The coupling head is similar to that disclosed in the copending application of Alfred O. Williams, for coupler, filed March 8, 1929, Serial No. 345,296. This head comprises a depending apron 7 which includes a rectangular socket element 8 and wings 10 diverging outwardly from the side arms of the socket element.

These wings define an inwardly converging passage for entrance of the draw head, and also serve to prevent excessive lateral movement of the draw head relative to the coupling head when the train of trailers is in motion.

The wings 10 are connected, at their outer ends, by a coupling element 11, which in the form illustrated is formed integrally with the wings and is arched or curved outwardly therefrom. This element 11 is of circular cross section and extends across the entrance to the passage defined by the wings. Due to its arcuate shape, I term the element 11 a coupling ring. The circular cross section of this element, shown in Figures 3 and 4, is preferred though not essential. The apron 7 and associated parts are disposed at one side of the axis of pin 5 and a counterweight 12 is disposed at the other side of such axis. This counterweight is connected to the wings of the apron by side arms 13 of substantially T-shape in cross section, these arms being formed integrally with the apron, that is, with wings 10 of the apron, and with the counterweight 12 and bearing eyes 6. Socket element 8 is connected to the counterweight 12 centrally thereof by a web element 14. By this construction, I provide the apron as an integral part of the head, the head being preferably cast as a unit. The counterweight 12 is of proper value to counterbalance the apron and associated parts thus holding the head in substantially horizontal position.

It will be noted that the coupling element 11 is arched outwardly away from the apron, thus facilitating coupling between two trailers, or a tractor and a trailer, which may be disposed at a decided angular relation laterally of the coupling head. It will also be noted (Figures 3 and 4) that the pin 5 is above the coupling element 11 so that pressure exerted on this element in the direction of the forward trailer will tend to rock the apron and, therefore, element 11 downwardly about pin 5.

The coupling head 4, constructed and mounted in the manner illustrated and described, cooperates with a draw head 15 bolted or otherwise suitably secured to angle bar 2 of the rear trailer. The draw head 15 comprises a base 16 from which extend the bolting flanges 17, and arms 18 extending forwardly from the base and formed integrally therewith, interior and exterior webs 19 and 20, respectively, connecting the lateral faces of these arms to the base. Each of the arms is provided with an inwardly projecting boss 21 defining an upwardly opening recess, these recesses being aligned transversely of the head and forming a slot for reception of the coupling ring or element 11. As will be noted more clearly from Figure 1, the walls at the end of this slot are of arcuate shape so as to permit of relative turning movement between the draw head 15 and coupling head 4.

As will be noted more clearly from Figures 3 and 4, the head 15 is inclined downwardly and forwardly and the forward or outer portion of each arm 18 is of approximately semi-elliptical shape, as at 18a.

The arms 18 are connected, at the upper portions of their forward ends, by an integral web 22. A latch member 23 is disposed between the arms 18 of head 15. This member is of approximately elongated U-shaped and has its lower arm 24 provided with a depending element 25 which carries an integral hub 26. This hub receives a pin 27 suitably secured through the arms 18. Latch member 23 extends below the slot which receives element 11 and then upwardly about the inner end of the slot and forwardly over the upper open side thereof. The upper arm 28 of the latch member constitutes a guard for normally closing the upper side of the slot and this arm 28 is provided with an extension 29 having lateral flanges 30, the under faces of these flanges as well as the extension 29 being inclined downwardly and inwardly toward the slot. Extension 29, and the associated flanges 30, cooperate with the upper face of the forward portion of head 15 to provide a passage which converges towards the slot in the head for directing the coupling ring 11 into the slot upon relative movement of the coupling head and the draw head toward each other. Element 29 is conveniently provided with an elongated opening 31 therein, and a circular opening 32, to facilitate movement of the latch member into inoperative position either by grasping the same directly or by insertion of a rod or equivalent member through the opening 32.

As will be noted more clearly from Figures 3 and 4, the forward wall of the slot which receives the element 11 is of arcuate shape, and the arc of this wall is substantially concentric with the coupling ring 11 when this ring is at the front or outer end of the slot, as shown. It is to be particularly noted that the axis of pin 27 is in the vertical plane of the center of coupling ring 11, when this coupling ring is at the outer end of the slot, such plane being indicated by the line a—b of Figure 3. Under such conditions, any upward pressure which may be exerted upon arm 28 of the latch member by ring 11, will not tend to turn this latch member about the pin 27 into open position, since such pressure can be exerted only at a point in vertical alignment with the axis of pin 27 or at points in rear of such axis. This is advantageous as effectively preventing casual opening of the latch member due to pressure exerted thereon by the relative upward movement of the coupling ring 11. In this manner I assure that the members of the coupling will not become uncoupled during transportation of the load.

The latch member 23 is normally held in closed position by a wire spring 33 mounted about hub 26, one end of this spring bearing against the under face of web 22 and the other end portion of the spring being bent around arm 24 of the latch member so as to exert upward pressure thereon. Movement of the latch member in closing direction is limited by a finger 34 projecting from arm 24 and disposed to contact an element 22a of web 22.

As will be noted more clearly from Figures 3 and 4, the lower arm 24 of the latch member is disposed below the slot which receives coupling ring 11, and the bight portion of the latch member is disposed rearwardly of the inner end walls of this slot so as to be exterior to the slot at the inner end thereof in the plane of the coupling ring 11. By this construction the load, during transportation, is taken by the head 15 which can readily be made of sufficient strength to withstand the stresses to which it is subjected. When the coupling ring 11 moves rearwardly in the slot, due to relative movement of the coupling head and the draw head toward each other, any jars incident to such movement of the coupling ring will be taken by the draw head at the inner or rearward end of the slot. This construction is of considerable importance as relieving the latch member of all stresses incident to coupling and transportation of the load and of such character as would be apt to cause damage to or breakage of the latch member.

What I claim is:—

1. In coupling means of the character described, a coupling head comprising a coupling element, a draw head provided with a slot open at one side and adapted for reception of said element, and latch means guarding the open side of the slot and disposed outwardly beyond the end walls thereof in the plane of the coupling element whereby the latch acts as a guiding means during the coupling operation and the load and shocks incident to coupling and transportation are taken directly by the draw head.

2. In coupling means of the character described, a coupling head comprising a coupling element, a draw head provided with a transverse slot opening through its upper face and adapted for reception of said element, a pivoted latch member guarding the open side of the slot and disposed outwardly beyond the end walls thereof in the plane of the coupling element to act as a guiding means to guide the coupling element into the slot, and yielding means normally holding the latch member in operative position.

3. In coupling means of the character described, a coupling head comprising a coupling element, a draw head having its upper face inclined downwardly toward the coupling head, the draw head and the coupling element having relative vertical movement and the draw head having a transverse slot opening through its upper face and adapted for reception of said element, a pivoted latch member guarding the open side of said slot and comprising a member extending forwardly beyond the slot and defining with the forward portion of the draw head a rearwardly converging passage for directing the coupling element into the slot, said latch member being disposed outwardly beyond the end walls of the slot in the plane of the coupling element, and yielding means normally holding the latch member in operative position.

4. In coupling means of the character described, a coupling head comprising a coupling element, a draw head provided in its upper face with an upwardly opening transverse slot adapted for reception of said element, a latch member extending below the slot and then upwardly about the inner end of the slot and forwardly across the upper open side thereof, said latch member being pivoted on the head on an axis extending transversely thereof and disposed in a vertical plane adjacent the outer end of the slot, the latch member being disposed exteriorly of the inner end of the slot in the plane of the coupling element, and yielding means urging the latch member in closing direction.

5. In coupling means of the character described, a coupling head comprising a coupling element, a draw head provided in its upper face with an upwardly opening transverse slot adapted for reception of said element, a latch member of approximately elongated U-shape defining an opening of greater extent than and extending about said slot at the lower and inner end portions thereof, the bight portion of the latch member being disposed exteriorly of the inner end of the slot and the upper arm of the latch member overlying the upper open side of the slot and preventing withdrawal of the coupling element upwardly therefrom, the lower arm of the latch member being pivoted on the draw head on an axis disposed transversely thereof and approximately in the vertical plane of the transverse center of the coupling element when said element is at the outer end of the slot, and yielding means normally holding the latch member in operative position.

6. In coupling means of the character described, a coupling head comprising a coupling element, a draw head provided in its upper face with an upwardly opening transverse slot adapted for reception of said element, and a latch member pivoted on the draw head on an axis extending transversely thereof and having an element extending across the open side of the slot and providing a guard therefor when the latch member is in operative position, the pivotal axis of the latch member being below the slot and on approximately dead center with the coupling element when said element is at the forward end of said slot.

7. In coupling means of the character described, a coupling head comprising a coupling element, a draw head provided in its upper face with an upwardly opening transverse slot adapted for reception of said element, and a latch member pivoted on the draw head on an axis extending transversely thereof and having an element extending across the open side of the slot and providing a guard therefor when the latch member is in operative position, the pivotal axis of the latch member being below the slot and so related thereto as to prevent movement of the latch member in opening direction by upward pressure exerted thereon by said coupling element, the latch member being disposed exteriorly of the slot at the inner end thereof.

8. In coupling means of the character described, a draw head provided with an upwardly opening transverse slot in its upper face, a latch member of approximately elongated U-shape extending below the slot and then upwardly about the inner end thereof and forwardly over the open side of the slot, providing a guard therefor, the lower arm of said member being provided on the head on an axis extending transversely thereof and in a vertical plane adjacent the outer end of said slot, the latch member being disposed exteriorly of the inner end of the slot and having limited movement in closing direction, and yielding means urging the latch member in closing direction.

9. In coupling means of the character described, a draw head provided with an upwardly opening transverse slot in its upper face, the outer end of said slot being of arcuate shape for reception of a coupling element of rounded section, a latch member of approximately elongated U-shape extending below the slot and then upwardly about the inner end thereof and forwardly over the open side of the slot, providing a guard therefor, the lower arm of said member being pivoted on the head on an axis extending transversely thereof and approximately in the vertical plane of the center about which the arc of the outer end of the slot is described, the latch member being disposed exteriorly of the inner end of the slot and having limited movement in closing direction, and yielding means urging the latch member in closing direction.

10. In coupling means of the character described, a draw head having its upper face inclined downwardly and outwardly, said head being provided in its upper face with an upwardly opening transverse slot, a latch member of approximately elongated U-shape extending below the slot and then upwardly about the inner end thereof with its upper arm extending forwardly over the open side of and beyond the slot, the under face of the forward end of said upper arm being inclined downwardly and inwardly of the head and defining, with the forward portion of said head, a passage converging toward the slot, the lower arm of the latch member being pivoted on an axis extending transversely of the head and in vertical alignment with the outer end portion of the slot, means limiting movement of the latch member in closing direction, and yielding means urging said latch member in closing direction.

11. In coupling means of the character described, a coupling member, a draw head provided with an upwardly opening transverse slot in its upper face, a latch member extending below the slot and then upwardly at the inner end thereof and forwardly over the open side of the slot, said latch member being pivoted on the head on an axis extending transversely thereof and in a vertical plane adjacent the outer end of the slot, whereby relative vertical movement of the coupler and head is ineffective to move the latch member and yielding means urging the latch member in closing direction.

12. In coupling means of the character described, a draw head comprising two spaced arms each provided in its upper face with a recess, said recesses being aligned transversely of the head and forming an upwardly opening slot for reception of a coupling element, a latch member of approximately elongated U-shape disposed between the arms and extending below the slot and then upwardly about the inner end thereof and forwardly over the open side of the slot, the lower arm of said member being pivoted on an axis in a vertical plane adjacent the outer end of the slot, and yielding means urging the latch member in closing direction.

13. In coupling means of the character described, a draw head comprising two spaced arms each provided in its upper face with a recess, said recesses being aligned transversely of the head and forming an upwardly opening slot for reception of a coupling element, a latch member of approximately elongated U-shape disposed between the arms and extending below the slot and then upwardly about the inner end thereof and forwardly over the open side of the slot, the lower arm of said member being pivoted on an axis in a vertical plane adjacent the outer end of the slot, and yielding means urging the latch member in closing direction, the arms extending forwardly beyond the bight portion of the latch member at the inner end of the slot.

14. In coupling means of the character described, a draw head comprising a securing base, two arms extending from the base and a web element connecting the outer ends of the arms, each of the arms having a recess in its upper face and said recesses being aligned transversely of the head and forming an upwardly opening slot for reception of a coupling element, a latch member of approximately elongated U-shape disposed between the arms and extending below the slot and then upwardly about the inner end thereof and forwardly over the open side of the slot, the lower arm of said member being pivoted on an axis in a vertical plane adjacent the outer end of the slot, means carried by the latch member and cooperating with the web element for limiting closing movement of said member, and a spring coacting with said web element and the latch member for urging the latter in closing direction.

15. In a coupling device comprising a coupling member, and a draw-bar having a lateral notch therein, and a latch for closing the notch, means for guiding the coupling member into the notch comprising coacting converging faces on the latch and draw-bar, the coupling member being pivoted to swing freely downwardly to facilitate sliding movement along the faces of the latch and draw-bar in the coupling operation.

16. A coupling means comprising a coupling member, a draw-bar having a lateral notch therein in which the coupling member may be engaged, and a latch of U-shape, one leg of which is pivotally attached to the draw-bar and the other of which is adapted to guard the entrance of the notch, the notch of the bar and the pivotal point of the latch being arranged in a vertical plane whereby relative vertical movement of the coupling member and draw-bar is prevented from disengaging them.

17. A coupling means including a coupling element and a draw head comprising two spaced side plates extending downwardly and outwardly, said plates being integrally connected at their rear ends by a flange securing bracket and at their forward ends by a connecting web portion, each of said plates being provided with a recess aligned transversely of the draw head and forming an upwardly opening slot for reception of said coupling element, and a U-shaped latch having a bearing extension intermediate its lower leg journaled on a pin disposed below said slot, the portion of the lower leg extending beyond said bearing extension having a concave cam surface for raising said coupling element free of said slot and latch.

18. A coupling means including a coupling element and a draw head comprising two spaced side plates extending downwardly and rearwardly, said plates being integrally connected at their rear ends by a flange securing bracket and at their forward ends by a connecting web portion, each of said plates being provided with a recess aligned transversely of the draw head and forming an upwardly opening slot for reception of said coupling element, and a U-shaped latch having upper and lower rearwardly extending legs in operative position, the lower leg having a bearing extension at an intermediate point thereon journaled on a pin disposed below said opening, the portion of said lower leg extending beyond said bearing extension engaging with said connecting web portion for limiting the movement of said latch to its operative position.

In witness whereof, I hereunto subscribe my name this 14th day of January, 1930.

ELY J. CONTOIS.